H. ESTABROOK.
PLATFORM-SCALES.
No. 177,823.  Patented May 23, 1876.
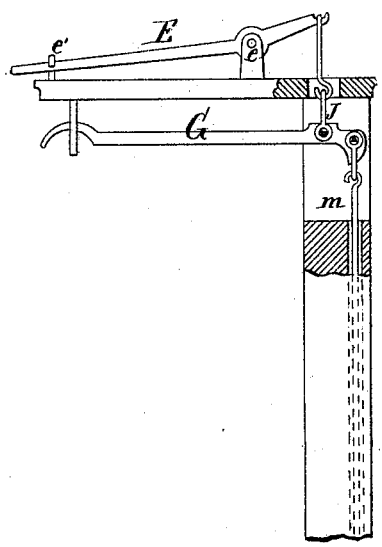
Fig. 1.
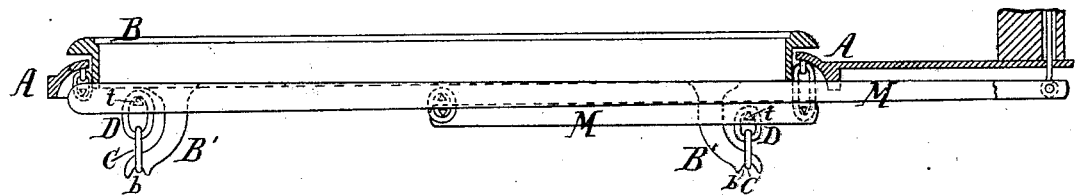
Fig. 2.
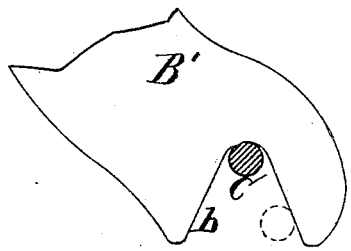
Witnesses:  Inventor.
Henry Gardner  Horace Estabrook
C. C. Stetson.  by his attorney

UNITED STATES PATENT OFFICE.

HORACE ESTABROOK, OF PATERSON, NEW JERSEY.

IMPROVEMENT IN PLATFORM-SCALES.

Specification forming part of Letters Patent No. 177,823, dated May 23, 1876; application filed December 14, 1875.

*To all whom it may concern:*

Be it known that I, HORACE ESTABROOK, of Paterson, Passaic county, in the State of New Jersey, have invented certain Improvements relating to Drop-Lever Weighing-Scales, of which the following is a specification:

The class of scales known as "drop-lever" is formed with only a moderate amount of leverage, adapted for weighing only moderate weights, so that on lowering the weigh-beam, by means of a hand-lever or the like, the levers which support the platform will be depressed so much below their ordinary motion as to fail to support the platform at all.

The platform is made to lap a little over the surrounding frame, and when the supporting-levers are lowered it bears upon the solid framing.

Serious defects in the accuracy of weighing seem to be inseparable from this class of scales, as heretofore constructed. It is believed to be due to the change in the points of contact, and the consequent obliquity of the supporting-links at some periods.

Scales are liable to considerable errors, too great to be permissible in practice, if they are allowed to act with the links in inclined positions. Ordinary drop-lever scales are liable to this evil. The object of my invention is to avoid it.

I suspend the platform to the knife-edges by means of links, and insure the exact positions of the bearings of the links.

The following is a description of what I consider the best means of carrying out the invention.

The accompanying drawings form a part of this specification.

Figure 1 is a vertical section along the center of the scale, down in the vicinity of the platform, and a section of the upper part at right angles thereto. In other words, it represents the upper part as turned quarter around; and Fig. 2 represents a portion of one of the downwardly-projecting arms formed on the platform, and a section of the link which applies therein to lift the scale when the drop-lever is operated therefor. This is on a larger scale. The dotted circle shows the displacement of the link which takes place when the platform is lowered, and the levers are, as is necessarily the case, lowered still farther.

Similar letters of reference indicate like parts in both the figures.

A is the fixed framing. B is the platform, made to overlap a little upon A, and when the levers M (which are of ordinary construction) are lowered the platform B rests directly upon A, as usual. My drop-lever E turns on its center $e$, and is held by the hook $e'$ in position to support the weigh-beam G by means of the loop J. Stout curved arms B' extend downward from the platform B, and each is forked at its lower end, so as to receive the link C, always in the same position. The link C, in turn, engages with the loop D, which rests on the proper knife-edge $t$.

When the levers M are lowered so that the knife-edges $t$ cease to support the platform, they necessarily turn on their fulcrum-pivots, and each knife-edge $t$ in its descent consequently describes a curved line. This curved line is the source of the difficulty with ordinary drop-lever scales. The supporting-loops D tend, as in the ordinary drop-lever scales, to move horizontally out of their proper bearing position; but my links C are held in the jaws $t$, so that in being brought up to their work they take their load in exactly their first positions.

The platform B and its load are always lifted with the links C taking hold at exactly the same points.

There is no shifting of the bearings.

Some of the advantages of my invention may be appreciable on scales not drop-lever; but I esteem it far more important on drop-lever scales, because the slackening of the work when the levers are dropped, and the disturbance in position due to their moving far down in curved paths, is the most prolific source of the displacement.

I claim as my invention—

The levers M, pendent links, and unchangeable bearings $b$ therefor on the platform-arms B', in combination with means E for lowering the weigh-beam G and the connected parts out of use, to form a drop-lever scale with unchangeable bearings, as herein set forth.

In testimony whereof I have hereunto set my hand this 1st day of November, 1875, in the presence of two subscribing witnesses.

HORACE ESTABROOK.

Witnesses:
 PHILLIPS ABBOTT,
 C. C. STETSON.